United States Patent [19]
Rinne

[11] Patent Number: 5,538,256
[45] Date of Patent: Jul. 23, 1996

[54] METHOD FOR PRODUCING A PACKING ARRANGEMENT FOR A HYDRAULICALLY OPERATED APPARATUS AND A PACKING ARRANGEMENT

[75] Inventor: Erkki Rinne, Espoo, Finland

[73] Assignee: Unicraft Oy, Helsinki, Finland

[21] Appl. No.: 94,063

[22] PCT Filed: Dec. 29, 1992

[86] PCT No.: PCT/FI92/00364

§ 371 Date: Jul. 27, 1993

§ 102(e) Date: Jul. 27, 1993

[87] PCT Pub. No.: WO93/13342

PCT Pub. Date: Aug. 7, 1993

[30] Foreign Application Priority Data

Jan. 2, 1992 [DE] Germany .......................... 42 00 035.1

[51] Int. Cl.⁶ .................................................. F16J 15/10
[52] U.S. Cl. .............................. 277/1; 277/106; 277/115; 277/117; 277/205
[58] Field of Search ............................. 277/1, 117, 106, 277/115, 188 R, 136, 164, 205; 264/271.1, 275, 320, 323, 325

[56] References Cited

U.S. PATENT DOCUMENTS

| | | |
|---|---|---|
| 967,392 | 8/1910 | Kingsbury . |
| 1,779,837 | 10/1930 | Batty ........................ 277/136 |
| 2,053,783 | 9/1936 | Ruesenberg ............... 277/115 |
| 2,368,744 | 2/1945 | Carey ........................ 286/26 |
| 2,747,905 | 5/1956 | Clade ........................ 277/1 |
| 2,869,947 | 1/1959 | Kemper ..................... 264/320 |
| 3,068,054 | 12/1962 | Schmidt et al. ........... 277/188 R |
| 3,288,222 | 11/1966 | Urbanosky ................ 166/192 |
| 3,914,968 | 10/1975 | Korsell et al. ............. 72/60 |
| 4,247,121 | 1/1981 | Bergman .................... 277/3 |
| 5,251,912 | 10/1993 | Rinne ......................... 277/3 |

FOREIGN PATENT DOCUMENTS

| | | |
|---|---|---|
| 301972 | 1/1972 | Austria . |
| 389358 | 4/1989 | Austria . |
| 1591246 | 6/1970 | France ............... 277/188 R |
| 416708 | 2/1923 | Germany . |
| 1806848 | 6/1969 | Germany . |
| 293808 | 10/1971 | Germany . |
| 518068 | 3/1955 | Italy .................... 277/106 |
| 346954 | 4/1931 | United Kingdom ......... 264/323 |
| 920959 | 3/1963 | United Kingdom . |

OTHER PUBLICATIONS

WO8001306 Int'l Appln. (International Search Report) DE 1 675 571; Published Jan. 1, 1971. DE 2 304 965; Published Aug. 22, 1974 (International Search Report) GB 1 496 986; Published Jan. 5, 1978.
1342707 Pub: Jan. 3, 1974, Great Britain PCT International Search Report.

*Primary Examiner*—William A. Cuchlinski, Jr.
*Assistant Examiner*—John L. Beres
*Attorney, Agent, or Firm*—Christie, Parker & Hale

[57] ABSTRACT

The invention relates to a new method for producing a packing arrangement for a hydraulically operated apparatus. The method comprises the following steps: (a) producing a preshaped plastic piece of seal material; (b) compressing said preshaped piece at room temperature into a cylinder; and (c) compressing said preshaped piece at room temperature to its final form in said cylinder between a piston member and a counter press member, at least one of said piston member and counter press member being provided with rounded or tapered head portion facing against said preshaped piece, whereby the cross-section of said final compressed seal member is essentially wedge-shaped. The invention relates also to a packing arrangement produced by the method of the invention.

10 Claims, 8 Drawing Sheets

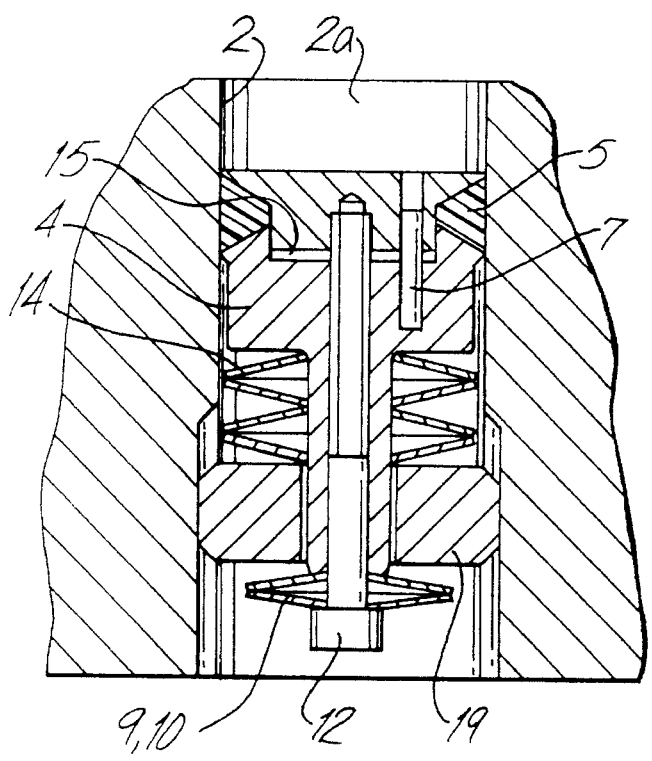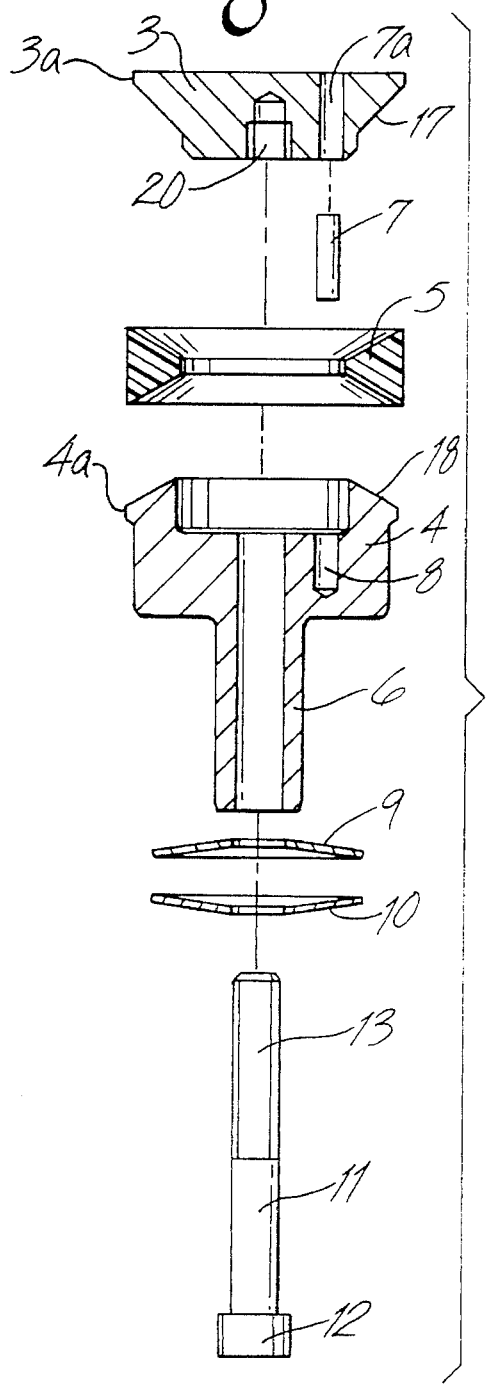

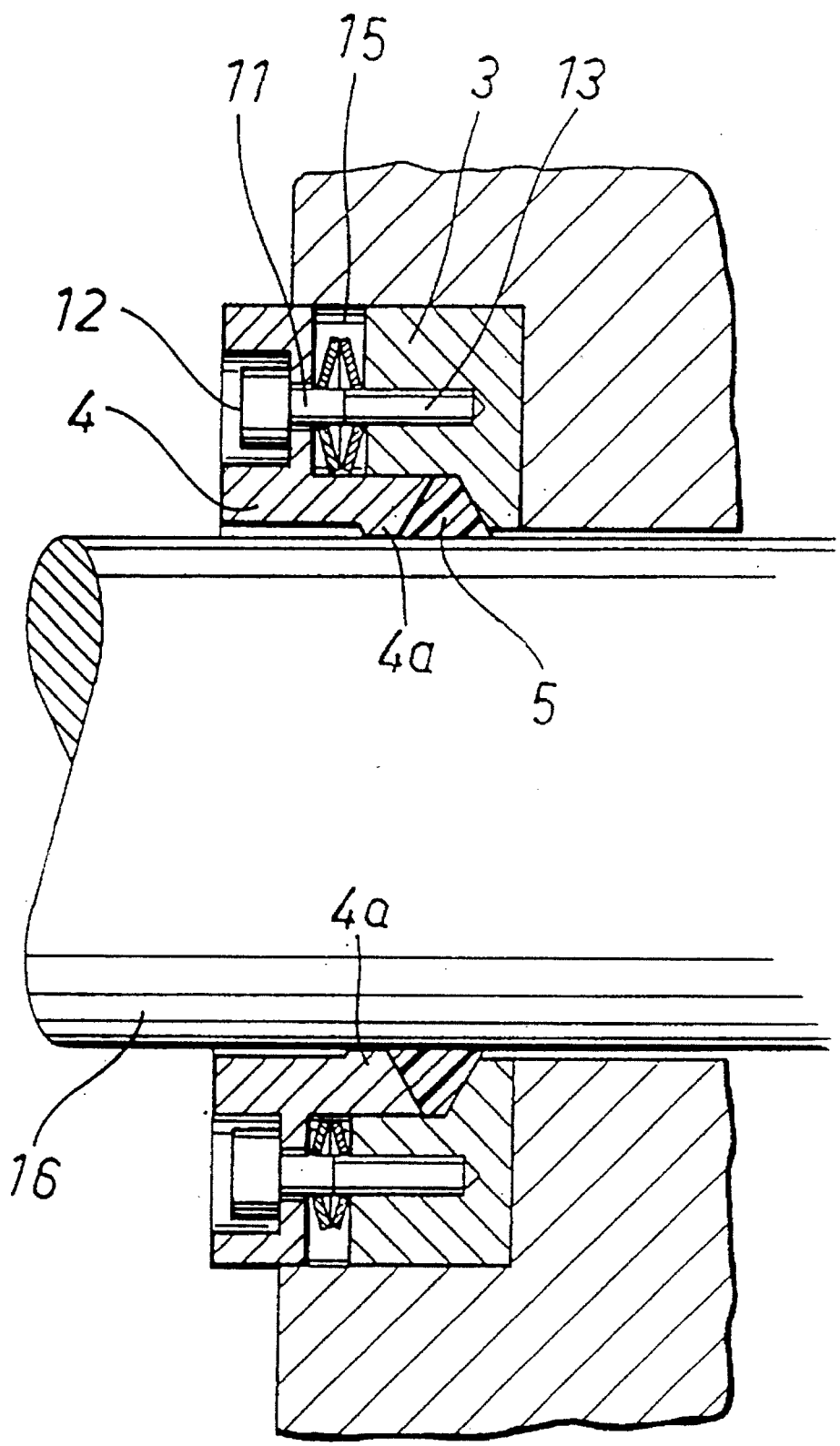

METHOD FOR PRODUCING A PACKING ARRANGEMENT FOR A HYDRAULICALLY OPERATED APPARATUS AND A PACKING ARRANGEMENT

FIELD OF THE INVENTION

A method for producing a packing arrangement for a hydraulically operated apparatus and a packing arrangement.

The present invention relates to a new method for producing a packing arrangement for a hydraulically operated apparatus and a packing arrangement. The invention relates especially to spring energized seals for different pressurized apparatuses.

BACKGROUND OF THE INVENTION

The new method and packing arrangement is essentially meant for producing a packing arrangement, which compensates for the wear and volume changes of seal material and of the cylinder, in which the said seal is moving axially and/or radially against metal surfaces to be sealed.

Accordingly an object of this invention is to provide a simple method for producing a packing arrangement for purposes, in which an elastic seal material, preferably PTFE compound, is compressed to its final shape at room temperature by means of press members made of steel, the press members being movable against each other by force to compress said seal material placed therebetween, thus forming an elastic seal material layer for sealing a gap between surfaces to be sealed, and which the packing arrangement is capable of compensating the temperature changes and the wear of seal material.

Another object of the invention is to provide an adjustable packing arrangement, particularly for a hydraulic fluid operated or mechanically operated system, which the arrangement is capable of withstanding substantial high pressures, even pressures of several hundred bars in a wide temperature range, but being suitable for minor pressures as well.

Still another object of the present invention is to provide a packing arrangement that is displaceable in an axial direction inside a cylindrical/tubular space, said packing arrangement being also suitable for the axially surrounding sealing of a shaft which is rotatable and/or axially displaceable within said space.

Still another object of the invention is to provide a relatively simple and effective packing arrangement for packing or sealing cylindrical/tubular spaces or shafts operating in such spaces, especially when applying relatively high operating pressures.

A packing arrangement of the invention finds a plurality of applications in mechanical seal components having considerable pressure differences on both sides to be sealed, e.g., flap-valves, ball valves, pistons etc. This type of seal and packing arrangement also can be used in any geometrical form of pistons and cylinders, which are used for seal arrangements on various designs in a machine construction.

To achieve the above and other objects of the invention, there is provided a method for producing a packing arrangement for a hydraulically operated apparatus, said method being characterized by the following steps:

(a) producing a preshaped plastic piece of seal material;

(b) compressing said preshaped piece at room temperature into a cylinder; and (c) compressing said preshaped piece at room temperature to its final form in said cylinder between a piston member and a counterpress member, at least one of said piston member and counterpress member being provided with rounded or tapered head portion facing against said preshaped piece, whereby the cross-section of said final compressed seal member is essentially wedge-shaped.

There is also provided a packing arrangement displaceable in an axial direction inside a cylinder/tubular space, characterized in that said packing arrangement includes: two metallic compression elements axially displaceable relative to each other, whose relative rotation is prevented, and a seal member, fitted between compression elements and cold-molded at room temperature from a blank and whose material comprises quite easily plastically moldable materials with a low friction coefficient, especially PTFE plastics in various compounds, or graphite, said cold-molding being effected by means of said compression elements in a cylinder/tubular space, said space serving as a final operating location for the packing arrangement or corresponding in its dimensions to a final operating location for the packing arrangement; that a molding surface included in at least one of the compression elements and positioned against seal member is designed to be conical or convex toward the seal member, whereby the seal member has a wedge-shaped cross-section after said molding, and that said packing arrangement further includes means for moving said compression elements axially toward each other for squeezing a seal member fitted therebetween against the wall of space to be sealed with an appropriate initial tightness prior to the application of the pressure effect of a pressure medium/ instrument on said packing arrangement.

According to another aspect of the present invention there is also provided a packing arrangement for sealing or packing a shaft rotatable and/or axially displaceable in a cylinder/tubular space, characterized in that said packing arrangement includes: two metallic compression elements, axially displaceable relative to each other and surrounding a shaft to be sealed, whose relative rotation is prevented, and a seal member, fitted between compression elements, set against said shaft and cold-molded at room temperature from a blank, whose material comprises quite easily plastically moldable, low friction coefficient materials, especially PTFE plastics in various compounds or graphite, said molding being effected by means of said compression elements; that a molding surface included in at least one of the compression elements and abutting against the seal member is designed to be conical or convex toward the seal member, whereby said seal member has a wedge-shaped cross-section after said cold-molding; and that said packing arrangement further includes means for moving compression elements axially toward each other for pressing said seal member fitted therebetween against said shaft to be sealed with an appropriate initial tightness prior to the application of the pressure effect of a pressure medium/pressure instrument on the packing arrangement.

One advantage gained by a packing arrangement of the invention is its relatively simple installation as the packing arrangement can be set up with relatively wide tolerances.

Thus, the packing can be installed in position by allowing first some pressure medium therethrough for the easy removal of any possible air entrapped in the pressure medium prior to the initial tightening of the packing, during which the seal member is brought into a sealing contact against a surface to be sealed. Following the initial tightening and by virtue of the structure of a packing arrangement, the pressure effect applied to the packing arrangement by a pressure medium subjects the seal member to a pressure exceeding that of the pressure medium, whereby the seal member presses more tightly against a surface to be sealed for preventing leaks through the packing arrangement. The selection of a coning angle can be used to provide a desired pressure reinforcement in the seal member.

THE PRIOR ART

The molding of granular polytetrafluoroethylene (PTFE) powders require techniques different from those commonly used with other thermoplastics. The PTFE-compound is molded with processes similar to those used for ceramics or powdered metals. Finished articles may then be obtained by machining or, sometimes directly from the molding process without other treatment. In the most common PTFE molding process the PTFE-compound powder is compacted in a suitable mold; the compact is then removed from the mold, heated to a temperature above the crystalline melting point (360° C.) to effect fusion of the individual particles, and cooled in a controlled manner to give the molded article a finished form. The compaction process is generally known as preforming and the heat treatment as sintering. During sintering the dimensions of the PTFE molded articles change significantly with a reduction in the dimensions perpendicular to the direction of preforming pressure application, and an increase in said direction. When making a mold for an item of any given diameter, the allowance must be made for any given PTFE-compound measurement, because of diametrical shrinkage of the PTFE-compound, which occurs during sintering.

Thus the mold should be made slightly oversize, by using the data given by the manufacturer of PTFE-powder. Filled compounds consist of granular PTFE-resin with various inorganic fillers. The PTFE-compounds are used in low friction, high temperature mechanical products requiring less deformation under load and better wear-resistance than offered by unfilled PTFE-compounds. The fillers that may be used are glass-fibre, graphite and various types of carbon, as well as bronze, and molybdenum disulfide in compositions ranging up to 60% by weight of filler. The recommended filler types and contents, depend on the applications, e.g., on load, speed, temperature, mating surfaces, wet or dry conditions, chemical or electrical stresses, etc. Also available are free-flow filled compound grades that have been developed especially for automatic molding and ram extrusion.

PTFE compounds are attractive because of their temperature properties and thermal stability. PTFE-compounds have an excellent resistance to heat. It is capable of continuous service at 260° C. and can withstand temperatures up to 360° C., for limited periods. Thermal expansion of PTFE-compounds is shown in FIG. 7 showing that the thermal expansion is not linear. Thus, the final operating temperature of a precision part must be accurately determined according to the manufacturers' recommendations. Filled PTFE seals have been used in conditions where normal elastomer seals often fail. The usual designs are shown in FIGS. 8–10 in which also steel and rubber springs are used to support the PTFE-seal against the wall. FIGS. 11–12 depict the pressure to temperature relationship of these designs respectively. Said constructions fulfill requirements for low friction, nonstick properties and resistance to chemicals, their drawbacks are, however, deformation which tend to creep under high load especially in high temperature range. The great thermal expansion of PTFE-compounds and elastomers may cause seal failure if not taken into account during seal design. In general, it is recommended that standard groove design be used as a starting point in the evaluation of a seal of PTFE-compounds elastomer. If the groove volume is inadequate, thermal expansion will result in either extrusion splitting of the seal (usually along the parting line of the seal) through the clearance gap or circumferential if it cannot extrude. In either case, it is recommended that the groove width is normally so great that the thermal expansion is possible and to accommodate the volume-increase in the elastomer O-ring and PTFE-compounds.

The prior art seals in FIGS. 9–10 are spring energized sealing elements for pressure applied from one side, they are used primarily for sealing reciprocating pistons and rods but also for rotary and swiveling motions and for static applications. The seal consists of two-components: an outer housing of a high strength plastic (e.g. PTFE) and integrated stainless-steel spring. As the seal is installed in the groove the spring forms a pretension to the seal. Since the seal is installed with the open side facing the higher system pressure, the sealing effect is increased as the pressure rises. The steel spring also has the additional function of compensating for wear at the seal lips.

The seal structure described above has one serious drawback, namely that it does not resist high-pressure and heat alterations simultaneously, as shown in FIGS. 11–12. For example, the seal does not resist 150 bar pressure in temperature of 150° C. The reason for this is due to the creep effect of the PTFE-compounds, especially in higher temperatures.

Nominal dimensions and tolerances are defined in standards ISO 6194/1-1982(E) and DIN 7160 or 7161 for the lip seals, which define strict nominal dimensions for the machined seal materials and metal parts, which means expensive machining, careful storage and the installation procedures.

The present invention is designed to avoid said drawbacks, particulary of PTFE-compound creep properties under high pressure and temperature to obtain the seal structures that do not leak in a widely changing temperature range, and to use said creep property as an advantage by means of the invention.

SUMMARY OF THE INVENTION

In view of the operation of the method for producing a seal arrangement of the invention, it is essential that the seal member is compressed into its final form between press members of metal, and wherein at least one of said press members can be left on its place to form actuating and/or adjusting means for said seal member which is forming the wedge-shaped seal layer between surfaces to be sealed. Said seal material is first machined or stamped from the PTFE-compound plate at room temperature near its final form and then said piece is compressed into its final place, wherein the said pressing means molds the seal material into its final wedge-shaped form.

The essential idea is tighten the seal material all the time during usage and cause high pressure to the plastic seal material by said press member so that the pressure of the seal is higher than the process pressure whereby the seal does not leak. Preliminary tests have indicated that the PTFE matrix reinforced with carbon/graphite fibers being compressed between said press members provide a packing arrangement which can compensate volume alterations of the seal material resulting from alterations due to thermal expansion and wear of the PTFE-composite and a metal body.

The most significant advantage gained by the seal arrangement of the invention is a considerable pressure and heat resistance with low friction properties.

BRIEF DESCRIPTION OF THE DRAWINGS

The invention will now be described with reference made to the accompanying drawings, in which:

FIG. 1 is a schematic longitudinal section showing one embodiment for a cylindrical/tubular packing arrangement of the invention, FIG. 2 shows the packing arrangement of FIG. 1 in an exploded view, FIG. 3 illustrates one embodiment for a shaft packing arrangement of the invention.

DETAILED DESCRIPTION

Figure 4:
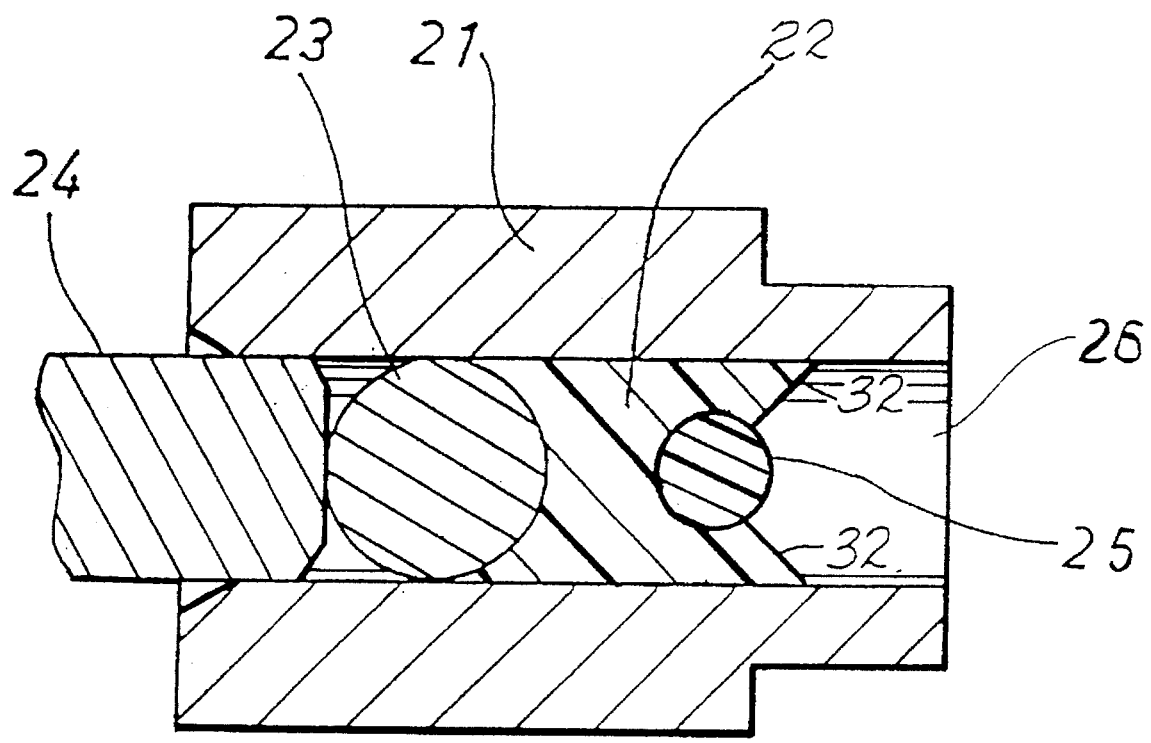
FIG. 4 is a schematic longitudinal section showing a second embodiment for a cylindrical/tubular packing arrangement of the invention.

According to FIGS. 1 and 2, a packing arrangement of the invention includes compression elements 3 and 4 with a seal member 5 fitted therebetween. In the embodiment of FIG. 1, the compression element 4 is provided with a rod portion 6 for facilitating relative tightening of the compression elements with the compression elements properly positioned in a space to be sealed. The initial form of seal member 5 can be, e.g., a blank lathed close to a final form or simply a blank made of a sealing compound. The molding of seal member 5 to a desired final form is effected by pressing at room temperature said blank 5 between mutually opposing molding surfaces 17 and 18 included in compression elements 3 and 4. The compression elements 3 and 4 are attached to each other with a screw, including a head portion 12, a stem portion 11, and a threaded portion 13 at the end of the stem portion. The screw extends through a through-going centre hole formed in first compression element 4 and its rod portion 6 and through a centre hole formed in seal member 5 into a threaded fastening hole 21 formed in second compression element 3. Tightening the screw causes the axial displacement of compression elements 3 and 4 toward each other, whereby said seal member 5 set therebetween moves radially toward the wall of a space 2 to be sealed. Simultaneously, the seal member is subjected to yet a little further deformation between molding surfaces 17, 18. The molding of seal member 5 is preferably effected, e.g., with a separate hydraulic press between said molding surfaces with the compression elements positioned in space 2, the compression elements not being joined together with the above-mentioned screw until after this molding action. During the course of tightening the screw, said compression elements 3, 4 must be locked or clamped against the relative rotation. This can be effected, e.g., by means of locking pin 7 fitting in a locking hole included in compression elements 3 and 4 whereby, upon turning the screw, said rod portion 6 is grabbed with an appropriate tool to prevent the compression elements from rotating in unison. When the space to be sealed has a cross-section other than circular, rotation of the compression elements is eliminated without a separate locking means. The object of a fastening screw is to join compression elements 3 and 4 together and to adjust the initial tightness of a seal member set therebetween. This possibility of adjusting the initial tightness makes it possible to dimension the outer diameter of seal member 5 to be smaller than the inner diameter of a space to be sealed for an easier installation of the packing arrangement. By adjusting the initial tightness the seal member can be brought against the wall of a space to be sealed for preventing the pressure medium leaks prior to the application of full pressure on the packing arrangement. In the embodiment shown in FIG. 1, a pressure medium acts from the direction of compression element 3 whereby, as the pressure effect created by the pressure medium is applied on compression element 3, the latter shifts toward the opposite compression element 4, thus resulting in a further displacement of the seal member toward the wall of a space to be sealed for even more effective operation of the packing. This axial displacement of the compression elements is facilitated by providing between compression elements 3 and 4 an axial clearance 15 within the central area thereof not provided with an intermediate seal member 5. This arrangement serves also as a limiter to said axial displacement. In order to reduce friction between compression element 4 and cylinder walls the outer surface of the element 4 has only a small area 4a close to said walls the remaining portion of said outer surface having a reduced diameter. Said small area is placed adjacent the outer edge of the melding surface 18. Correspondingly, the compression element 3 has a small outer surface area 3a adjacent the outer edge of its molding surface 17. By means of these areas 3a and 4a the seal member 5 is placed in an essentially closed space.

As shown in FIG. 1, the packing arrangement further includes spring members 9, 10 between the fastening screwhead portion 12 and the outer end of rod portion 6 included in first compression element 4, said spring members serving to compensate for the wear of seal member 5 and/or to adjust its initial tightness. In addition and according to the embodiment of FIG. 1, the packing arrangement includes a spring member 14, surrounding said rod portion 6 and positioned between a locking nut 19 and the outer surface of compression element 4. The object of spring member 14 is to return compression elements 3 and 4 back to their original position upon ceasing the pressure effect and to operate with locking nut 22 as a blocking means for preventing the displacement of packing arrangement 1 out of a space to be sealed as a result of the pressure effect applied on the outer surface of compression element 3.

The embodiment of FIG. 3 differs from that of FIG. 1 in that the former is intended to seal or pack a shaft 16 operating in a cylinder space, the packing arrangement surrounding said shaft 16 and the seal member 5 being located in the packing arrangement centre hole and setting against shaft 16 upon pressing said compression elements 3 and 4 toward each other. This embodiment preferably includes more than one fastening screws, e.g., 4 screws, for squeezing a seal member 5 as uniformly as possible against said shaft 16 to be sealed.

The sealing material used in a packing arrangement of the present invention comprises preferably various types of graphite- or carbon-fiber compounded/reinforced plastics, such as PTFE plastics, graphite or carbon fibers, or similar materials having a low friction coefficient and being plastically quite easily moldable at room temperature.

A second embodiment for a cylindrical/tubular packing arrangement of the invention is described in FIG. 4. A seal 22 is formed by pressing seal material, e.g., PTFE-compound, within cylinder 21 between a ball bearing 23 and counterpress member (not shown) having a conical head portion the diameter of said head portion being less than that of ball bearing 23. In this embodiment ball bearing 23 with shaft means 24 are left in their place to be used as a piston means, in order to transmit pressure to the pressure medium 26 while said counterpress member is replaced with a rubber ball 25 press fit into the seal material 22. Said rubber ball serves as a spring means for said seal 22. Said seal forms a lip portion 32 which enhances the effect of the seal.

Figure 5:
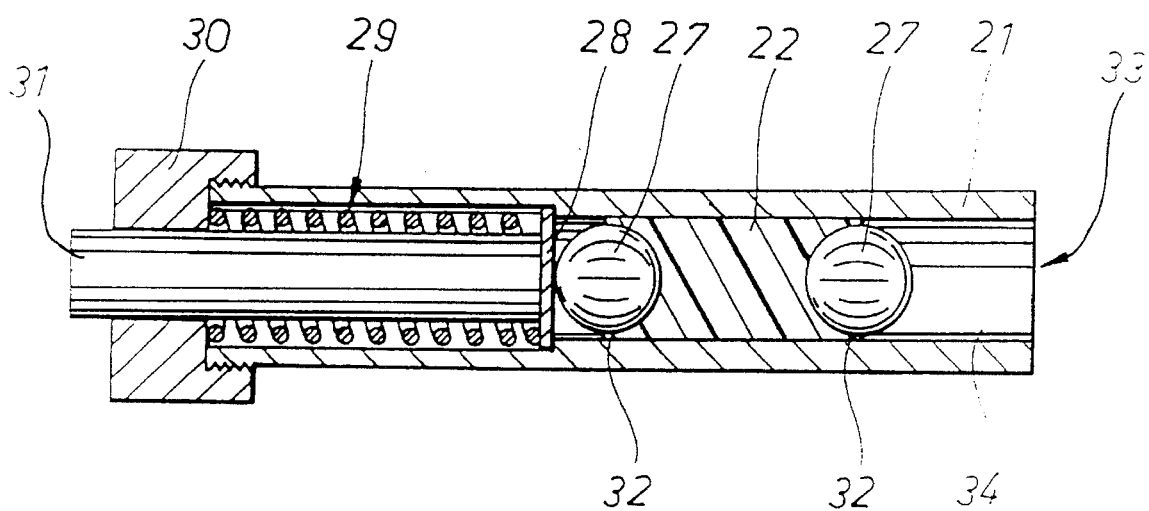
FIG. 5 is a schematic longitudinal section showing a third embodiment for a cylindrical/tubular packing arrangement of the invention, FIG. 6 consisting of FIGS. 6A, 6B and 6C is a schematic view of the manufacturing phases I, II and III of an embodiment for a cylindrical/tubular packing arrangement of the invention.

A third embodiment for a cylindrical/tubular packing arrangement of the invention is described in FIG. 5. A seal 22 is formed between ball bearing 27. One end of the seal 22 is facing toward pressure medium which is pressurized, e.g., by means of hydraulic apparatus (not shown). At the other end of the seal 22 there is arranged a piston rod 31 extending outwardly from the ball 27, said rod 31 being provided with a pressure plate 28 at the end facing against the ball 27. Around the piston rod 31 is assembled a spring element, e.g., compression spring 29. Said spring is arranged to stay in a cylinder space around rod 31 by means of threaded cylinder 30 provided with a hole for the piston rod 31. The use of the compression spring 29 helps return the seal 22 backward as the pressure effect ends and piston rod 31 returns to its original place.

The embodiment illustrated in FIG. 5 can be used on the opposite direction by means of changing the compression spring to an extension spring, whereby when the pressure effect is directed to the piston rod 31, e.g., mechanically, the seal 22 moves in its cylinder space away from the part 30 causing pressure on the pressurizing medium 34, which in turn can use apparatus suitable for the application. Thus, when the pressure effect to the piston rod 31 ends, the extension spring withdraws the pressure plate 28 backwards, whereby the pressure of the pressurizing medium drops and the apparatus returns to its initial state.

Figure 6:
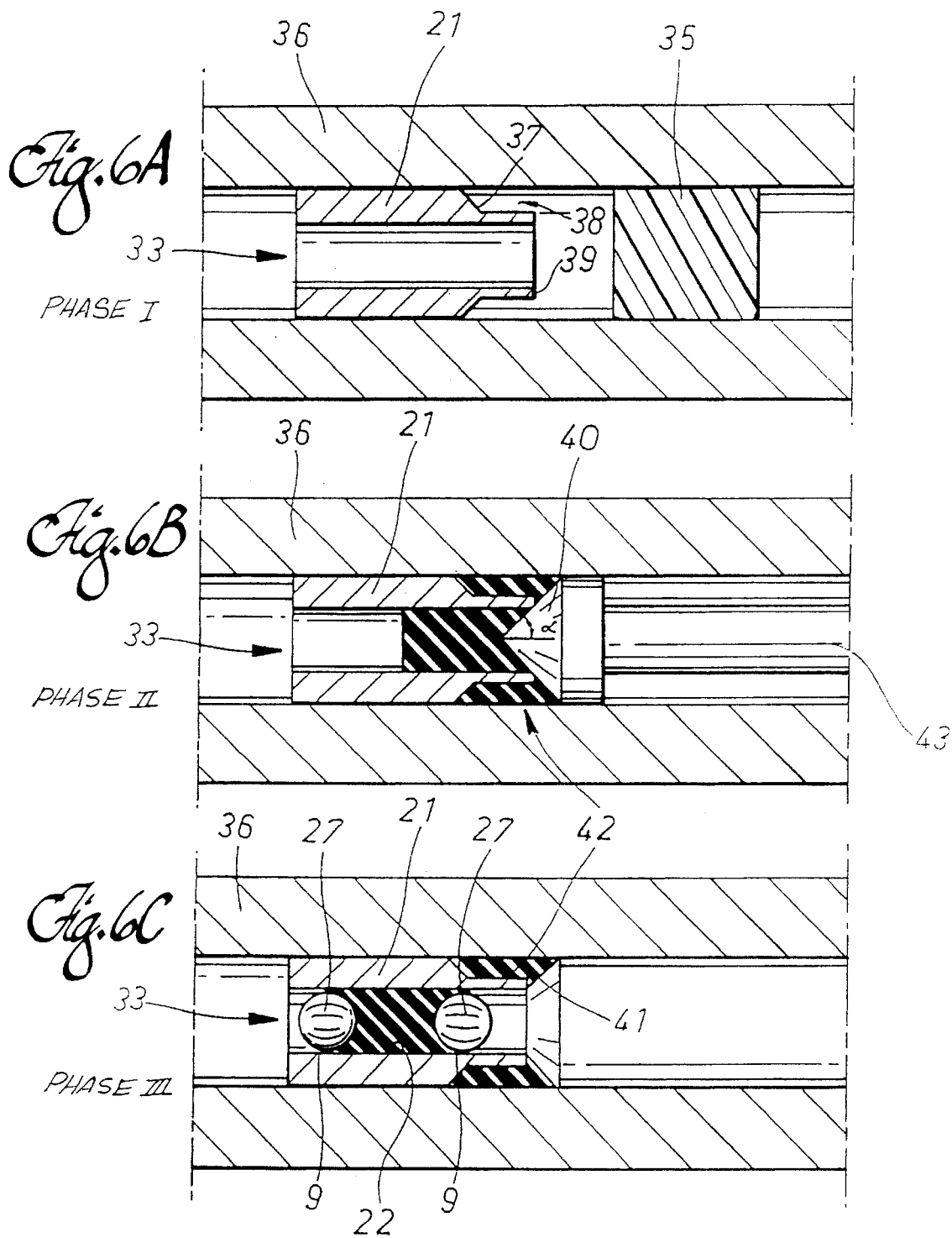
Figure 7:
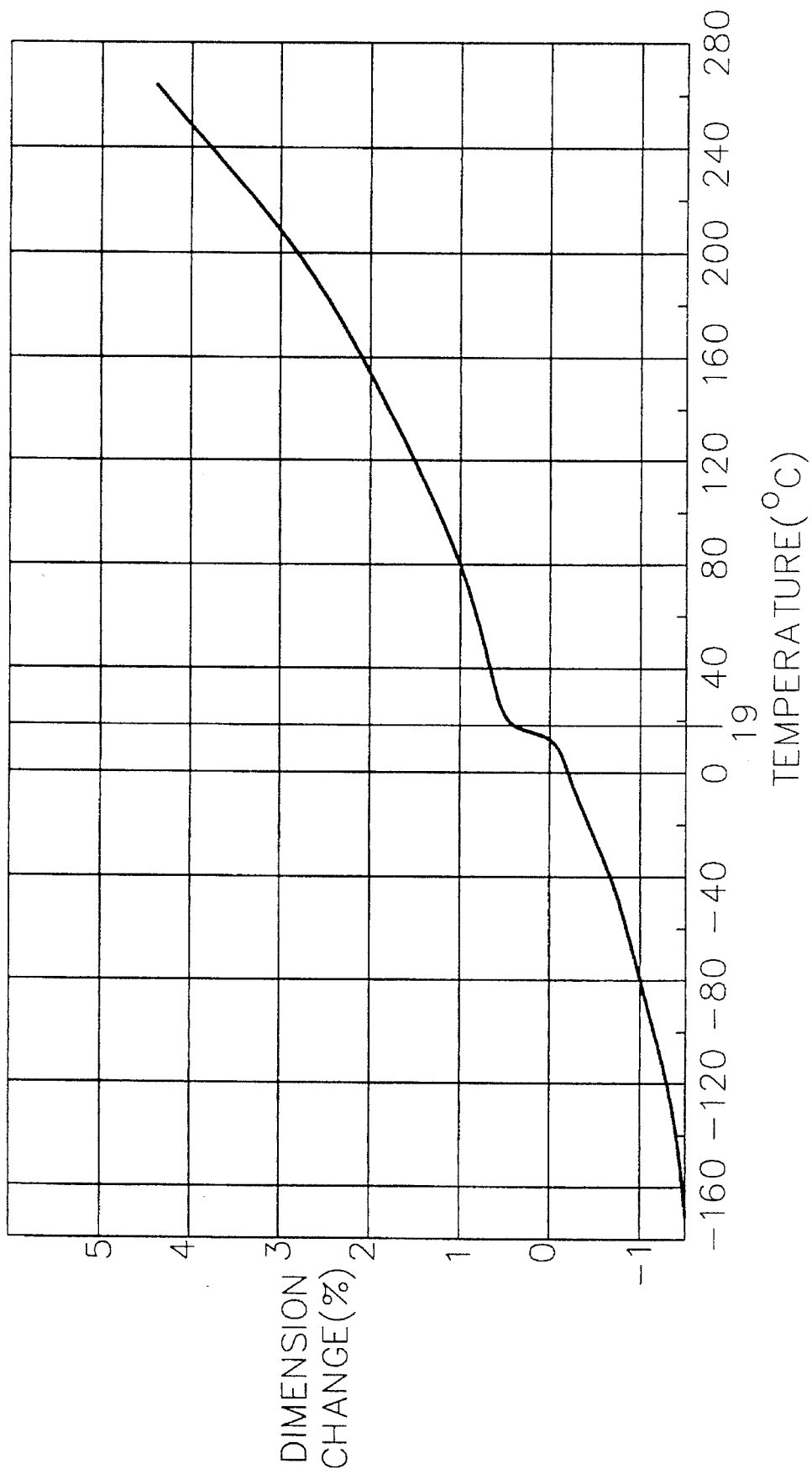
FIG. 7 shows thermal expansion of unfilled PTFE.
Figure 8:
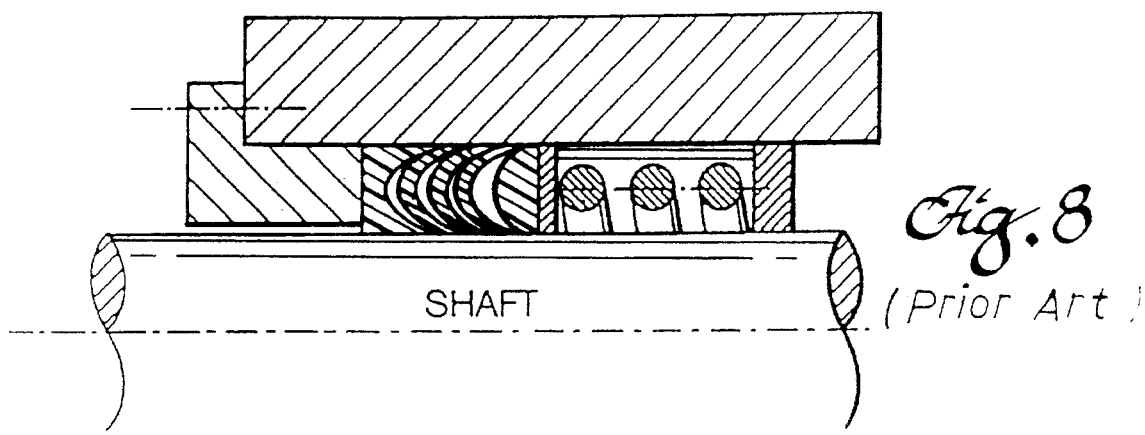
FIGS. 8–10 show prior art seal arrangements.
Figure 9:
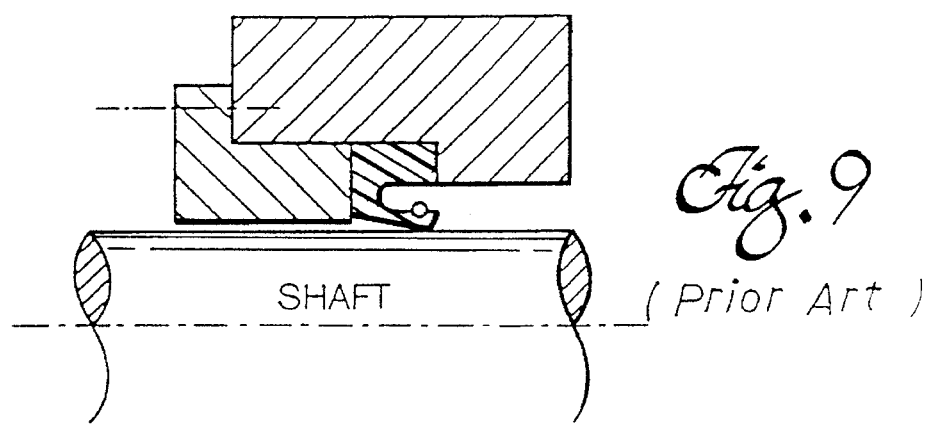
Figure 10:
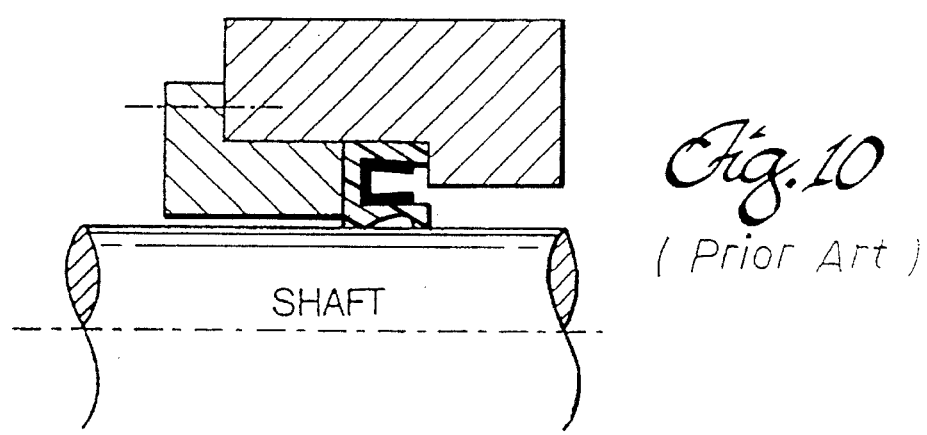
Figure 11:
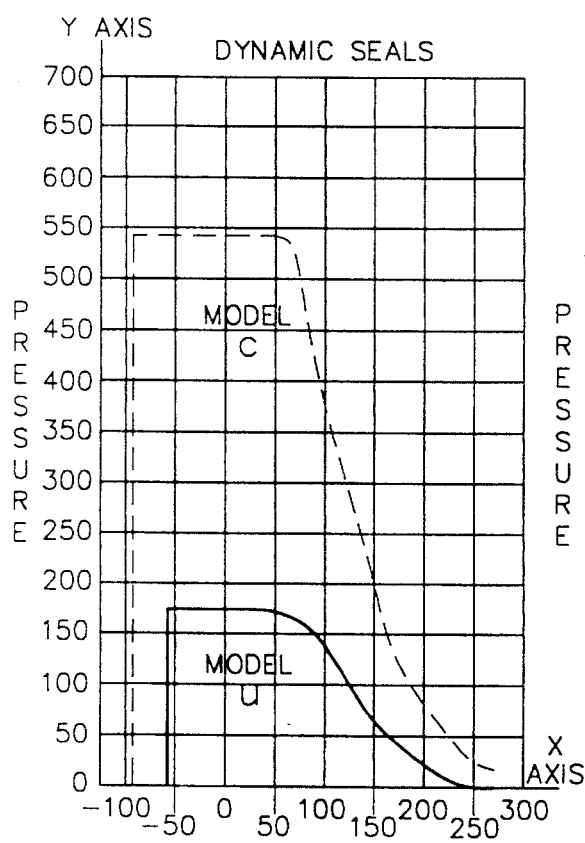
FIGS. 11–12 show a pressure-temperature relation in prior art dynamic and static seals, respectively.
Figure 12:
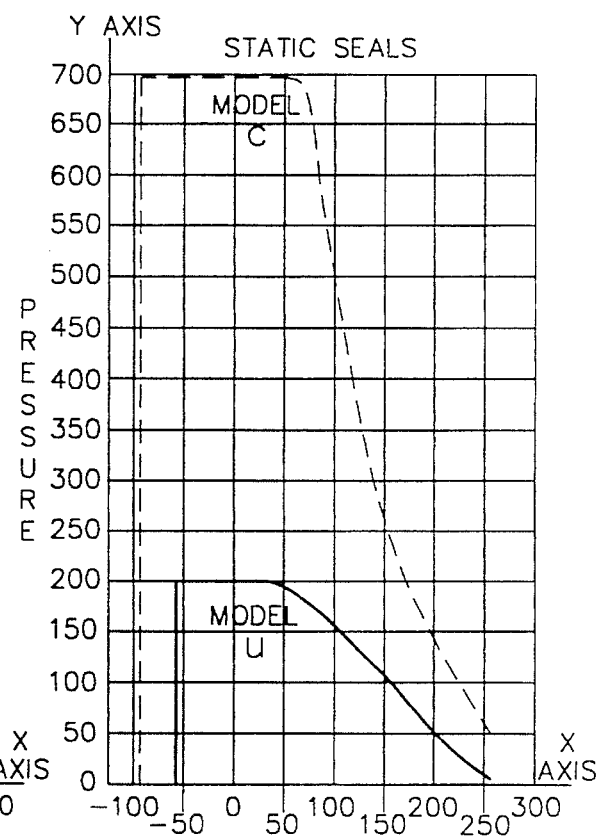

FIG. 6 shows one embodiment of producing phases. In phase I a preshaped seal piece 35, which has been produced by stamping or cutting from a plate or rod of PTFE-compound, and a cylinder 21 are placed into an assembly cylinder 36. In phase II the seal piece 35 is pressed at room temperature against cylinder 21 so that seal material enters into cylinder space 33 of the cylinder 21 and into a gap 38 between the outer wall of said cylinder 21 and inner wall of the assembly cylinder 36. This pressing of the seal piece 35 is effected by a push rod 43 having a conical head 40, whereby the conical head 40 cuts the preformed seal piece 35 as the head 40 is pressed against the cylinder 21. At this stage the seal material in the space 38 outside the cylinder 21 forms an exterior seal having a lip portion 41. The tapering angle of the head 40 and the lip portion 41 depends on the material to be sealed and the pressure used. Preliminary tests have proved that the advantageous angle against the PTFE compound is about 60°, while the fluid generally requires a smaller angle. Preliminary tests are required to find the right angle for each material combination.

The exterior surface of cylinder 21 forming said gap 38 is preferably provided with a chamfer 37. Said cylinder body 21 provided with the exterior seal is advantageous when the cylinder 21 is used for the initial setting of pressure in a cylinder where the cylinder 21 is assembled, whereby fine adjustment of the pressure happens in cylinder space 33 by seal 22 and its pressure means, like steel balls 27.

In phase III the seal material is compressed at room temperature to its final form, which compression is being made by means of steel ball bearings 27 and pressurizing means, or with dies (not shown) so that the steel balls are forming the seal material to its final form, while the balls (pistons) are moving toward each other under the compression.

The lip portion 32 adds the seal effect on seal 22, which is caused by means of a pressure medium and the pressure means, which are compressing the lip portion 32 against the inner wall of cylinder 21. Said lip portion 32 creeps in use and tightens against said wall.

This kind of seal arrangement can be constructed as a separate cylinder part, which can be assembled into the body part of the machine or apparatus. Naturally the seal 22 can be assembled into the cylinder hole made in the body part, wherein many different sizes of cylinders are connected to each other by means of a common pressure medium channel, to form a closed pressurizing system.

On one aspect of the invention the seal material is carbon or graphite reinforced PTFE-plastic, which has a very low friction factor.

The seal material according to the invention is preferably carbon/graphite reinforced PTFE-compound. The advantage of the PTFE-compound is that it has good friction properties and wide temperature range.

The disadvantage of the PTFE-compound is its creep property, especially at a higher temperature range and that property is used as an advantage according to the invention, wherein the said PTFE-compound is always kept in closed space.

According to the invention, piston end and/or counterpress member is forming the seal material all the time when pressure (either from the piston means or from the pressure medium) is affecting said seal member, thus forming effective seal structure that is compensating wearing of the seal material. In addition by choosing a suitable gap between the cylinder space and the piston means and/or counterpress members, wearing of the cylinder space is smaller as the PTFE-compound is the only material affecting the wearing.

In the embodiments shown it is naturally possible to use also ball end, conical end piston, or pressing means instead of a ball bearings.

In addition an application of a similar seal profile and construction can be applied to any geometrical form of piston elements, e.g., square, triangular, etc., which can move in the equivalent cylinder.

Although the seal construction and a method of the invention have been described above, further modifications can be made without departing from the inventive concept, the invention is not to be limited to the embodiments, except by the scope of the appended claims.

What is claimed is:

1. A method for producing a packing arrangement for a hydraulically operated apparatus comprising the steps of:

(a) producing a preshaped plastic piece of seal material wherein said seal material is PTFE reinforced with a material selected from the group consisting of carbon, graphite, and glass fibre;

(b) placing said preshaped piece at room temperature into a cylinder; and (c) compressing said preshaped piece at room temperature to its final form in said cylinder between a piston member and a counterpress member, at least one of said piston member and counterpress member being provided with a tapered head portion facing against said preshaped piece whereby the cross-section of said final compressed seal member is essentially wedge-shaped.

2. The method of claim 1, wherein said piston member is left in its place after said final compressing of the seal member, said piston member being provided with means for setting the tightness of said seal member against the walls of said cylinder.

3. The method of claim 1 wherein the piston member includes a ball bearing head and wherein after said final compressing there is the step of replacing the counterpress member with a rubber ball forming a spring means for said seal member.

4. A packing arrangement displaceable in an axial direction inside a cylinder space comprising: two metallic compression elements axially displaceable relative to each other, at least one of said compression elements having a tapered head portion; means for preventing relative rotation between said compression elements; a seal member comprising a PTFE compound reinforced with a material selected from the group consisting of carbon, graphite, and glass fibre, said seal member being fitted molded between the tapered head portion and the other compression element at room temperature in said cylinder space whereby said tapered head portion causes said seal member to have a wedge-shaped cross-section; and means for moving said compression elements axially towards each other for squeezing said seal member fitted therebetween against a wall of the cylinder space causing the seal to be sealed against the wall with an appropriate initial tightness prior to the application of a pressure medium on said packing arrangement.

5. A packing as set forth in claim 4 wherein said means for moving said compression elements comprises a spring member for compensating for the wear of said seal member by moving said compression elements axially relative to each other according to the wearing rate of said seal member.

6. A packing as set forth in claim 4 or 5 wherein said seal member and said compression elements each have a center hole, and wherein said means for moving said compression elements further comprises fastening means extending through the center hole of said seal member and said compression elements whereby the displacement of the compression elements closer to each other results in the displacement of said seal member radially outward and toward said wall of said space to be sealed.

7. A packing as set forth in claim 6, wherein said fastening means comprises a screw for adjusting the initial tightness between said compression elements, said screw having a head portion and a threaded stem portion, said stem portion extending through the center holes of said seal member and said compression elements.

8. A packing as set forth in claim 7, wherein said compression elements are joined together in a manner that, with said seal member fitted therebetween, the surfaces facing each other in a central area of said compression elements left vacant by said seal member are spaced from each other whereby after the adjustment of initial tightness, the compression elements can move yet closer toward each other in said axial direction as a result of the pressure on said packing arrangement.

9. A packing arrangement for sealing a shaft rotatable and axially displaceable in a cylinder space comprising: two metallic compression elements axially displaceable relative to each other and surrounding a shaft to be sealed, at least one of said compression elements having a conical head portion; means for preventing relative rotation between said compression elements; and a seal member fitted and cold-molded between said compression elements set against said shaft, said seal member comprising a PTFE compound reinforced with a material selected from the group consisting of carbon, graphite, and glass fibre; whereby said conical head portion causes said seal member to have a wedge-shaped cross-section; and means for moving compression elements axially toward each other for pressing said seal member fitted therebetween against said shaft causing the seal to be sealed against the shaft with an appropriate initial tightness prior to the application of a pressure medium on said packing arrangement.

10. A method for producing a packing arrangement for a hydraulically operated apparatus comprising the steps of:

(a) producing a pre-shaped plastic piece of seal material;

(b) compressing said pre-shaped piece at room temperature into a cylinder;

(c) compressing said pre-shaped piece at room temperature to a seal arrangement in its final form in said cylinder between a piston member including a ball bearing head portion and a counterpress member including a tapered head portion which extends into the seal arrangement, and wherein after said step of compressing there is the step of replacing the tapered head portion with a rubber ball in the seal arrangement thereby forming a spring means for said seal arrangement.

* * * * *